Patented June 26, 1945

2,379,026

UNITED STATES PATENT OFFICE 2,379,026

TREATMENT OF TEXTILE AND OTHER MATERIALS

Robert Wighton Moncrieff and Harold Bates, Spondon, near Derby, England, assignors to British Celanese Limited, London, England, a company of Great Britain No Drawing. Application August 4, 1942, Serial No. 453,601. In Great Britain July 7, 1941

10 Claims. (Cl. 8—120)

This invention is concerned with improvements in or relating to the treatment of textile materials, and particularly in processes for improving the wet strength of yarns, cords, foils and other materials having a basis of substances containing free hydroxy groups, particularly cellulosic substances.

The wet strength of textile and other materials made of substances containing free hydroxy groups, for example materials made of regenerated cellulose or organic derivatives of cellulose, is usually considerably lower than their dry strength, which is, of course, undesirable, particularly in the case of materials, for example parachute fabrics and cords and tent- and sail-cloths, which may become wetted during their use.

In the case of some materials, for example materials made of some polyvinyl compounds containing a substantial proportion of hydroxy groups, their sensitivity to water may be so great that on immersion they dissolve or their structure it at least seriously affected.

It has now been discovered that the wet strength of such materials may be considerably improved by treating the materials with a mixture of an ester of an organic acid containing at least six carbon atoms and preferably at least twelve carbon atoms, for example 15, 20 or more, and the anhydride of an organic acid containing a smaller number of carbon atoms, particularly of a fatty acid containing less than six carbon atoms e. g. acetic, propionic or butyric anhydride. Naturally occurring esters, for example beeswax, may be employed as may synthetic esters, e. g. ethyl laurate, palmitate and stearate.

The treatment is applicable generally to the improvement of the water-resistant properties of materials made of substances containing free hydroxy groups but because of their outstanding industrial importance it is of particular value for the treatment of cellulosic materials, for example cotton, linen, regenerated cellulose materials obtained by the viscose or cuprammonium process or by the saponification of materials made of an organic ester of cellulose, and materials having a basis of an organic derivative of cellulose which contains free hydroxy groups, for example cellulose acetate, propionate or butyrate or methyl or ethyl cellulose. Of these materials particular mention may be made of yarns and other materials having a basis of regenerated cellulose and having a high tenacity obtained by stretching and then completely saponifying materials made of cellulose acetate or other organic ester of cellulose. Yarns and other materials made of high viscosity cellulose derivatives and regenerated cellulose materials obtained by the saponification of such cellulose derivative materials, which may be produced as described in U. S. application S. No. 439,918 filed April 21, 1942, are another important class of materials which may with advantage be treated by the process of the present invention.

The treatment is effected under such conditions that the structure of the materials is maintained. It may be effected by heating the materials in a non-solvent medium comprising the ester and anhydride dissolved in a liquid which is a non-solvent for the materials, for example benzene, toluene or other hydrocarbon or isopropyl or other ether, but preferably it is effected by impregnating the materials with the mixture of anhydride and ester by immersing them in such a medium and then removing the materials and heating the impregnated materials in the absence of a liquid medium. In order to obtain a uniform reaction the materials should be thoroughly scoured before treatment. Whether the solution of the ester and anhydride is employed throughout the treatment or merely for impregnation, it is desirable that it should contain only a low concentration of the reagents, for example 5 or 10% and that the volume-ratio of liquid medium to materials should be high, for example 50 or 100 to 1. Impregnation may be carried out at a fairly low temperature, for example 40 or 50° C., but the subsequent treatment is preferably effected at a higher temperature, for example 100 or 120° C. A comparatively small increase in the weight of the materials, for example about 5 or 10%, is sufficient to give a considerable improvement in their wet strength. Moreover the improvement persists even after the materials have been wetted and squeezed or otherwise subjected to pressure which tends to force the water into their interstices.

The following is an example of the treatment of a regenerated cellulose material according to the process of the present invention.

A fabric made of regenerated cellulose yarns obtained by stretching cellulose acetate yarns and then completely saponifying them is well scoured, washed and dried and then impregnated for about 30 minutes at about 40° C. in a solution consisting of 10% of beeswax, 5% of acetic anhydride and 85% benzene, the volume ratio of liquid to fabric being 100 to 1. At the end of this time the fabric is removed and the liquid expressed until the fabric retains 100% of its weight of liquid. The fabric is dried in air at room temperature after which it is heated for 30 minutes at 100 to 110° C. It is then scoured and dried and has a considerable improved wet strength.

The wet strength of cord or rope made of similar regenerated cellulose yarns may also be improved considerably by subjecting it to a similar treatment, but owing to the relative impermeability of the material longer impregnation is desirable e. g. 12 or even 24 hours.

Having described our invention what we desire to secure by Letters Patent is:

1. Process for the treatment of yarns, cords, foils and other materials having a basis of a cellulosic substance containing free hydroxy groups, which comprises heating and reacting such materials in a non-solvent medium comprising a mixture of an ester of an acid having the formula $CH_3(CH_2)_nCOOH$ where $n$ is at least 4 and an anhydride of a saturated monocarboxylic acid containing more than one and less than five carbon atoms dissolved in a solvent therefor, the reaction being continued until the weight of the materials has increased by at least 5%.

2. Process for the treatment of yarns, cords, foils and other materials having a basis of a cellulosic substance containing free hydroxy groups, which comprises heating to at least 100° C. and reacting such materials in a non-solvent medium comprising a mixture of an ester of an acid having the formula $CH_3(CH_2)_nCOOH$ where $n$ is at least 10 and an anhydride of a saturated monocarboxylic acid containing more than one and less than five carbon atoms dissolved in a solvent therefor, the reaction being continued until the weight of the materials has increased by at least 5%.

3. Process for the treatment of yarns, cords, foils and other materials having a basis of a cellulosic substance containing free hydroxy groups, which comprises heating to at least 100° C. and reacting such materials in a non-solvent medium comprising a mixture of an ester of an acid having the formula $CH_3(CH_2)_nCOOH$ where $n$ is at least 10 and acetic anhydride dissolved in a solvent therefor, the reaction being continued until the weight of the materials has increased by at at least 5%.

4. Process for the treatment of yarns, cords, foils and other materials having a basis of regenerated cellulose, which comprises heating such materials at a temperature of at least 100° C. in a non-solvent medium comprising a mixture of beeswax and acetic anhydride dissolved in a solvent therefor until the weight of the materials has increased by at least 10%.

5. Process for the treatment of yarn, cords, foils and other materials having a basis of a cellulosic substance containing free hydroxy groups, which comprises impregnating such materials with a non-solvent medium comprising a mixture of an ester of an acid having the formula $CH_3(CH_2)_nCOOH$ where $n$ is at least 4 and an anhydride of a saturated monocarboxylic acid containing more than one and less than five carbon atoms dissolved in a solvent therefor, and heating the impregnated materials at a temperature of between 100 and 120° C. until the weight of the materials has increased by at least 10%.

6. Process for the treatment of yarns, cords, foils and other materials having a basis of a cellulosic substance containing free hydroxy groups, which comprises impregnating such materials with a non-solvent medium comprising a mixture containing an ester of an acid having the formula $CH_3(CH_2)_nCOOH$ where $n$ is at least 10 and acetic anhydride dissolved in a solvent therefor, the ester and anhydride being each present in an amount not greater than 10% of the weight of the medium, and heating the materials at a temperature of between 100 and 120° C. until their weight has increased by at least 10%.

7. Process for the treatment of yarns, cords, foils and other materials having a basis of a cellulosic substance containing free hydroxy groups which comprises impregnating such materials in a non-solvent liquid medium comprising a mixture of an ester of an acid having the formula $CH_3(CH_2)_nCOOH$ where $n$ is at least 4 and an anhydride of a saturated monocarboxylic acid containing more than one and less than five carbon atoms dissolved in a solvent therefor, removing the impregnated materials from the non-solvent medium and heating them at a temperature of at least 100° C. until the weight of the materials has increased by at least 5%.

8. Process for the treatment of yarns, cords, foils and other materials having a basis of a cellulosic substance containing free hydroxy groups which comprises impregnating such materials at a temperature of 40 to 50° C. in a non-solvent liquid medium comprising a mixture of an ester of an acid having the formula $CH_3(CH_2)_nCOOH$ where $n$ is at least 4 and an anhydride of a saturated monocarboxylic acid containing more than one and less than five carbon atoms dissolved in a solvent therefor, removing the impregnated materials from the non-solvent medium and heating them at a temperature of 100 to 120° C. until the weight of materials has increased by at least 10%.

9. Process for the treatment of yarns, cords, foils and other materials having a basis of a cellulosic substance containing free hydroxy groups which comprises impregnating such materials in a non-solvent liquid medium comprising a mixture of an ester of an acid having the formula $CH_3(CH_2)_nCOOH$ where $n$ is at least 4 and an anhydride of a saturated monocarboxylic acid containing more than one and less than five carbon atoms dissolved in a solvent therefor, the ester and anhydride being each present in an amount not exceeding 10% of the weight of the medium, removing the impregnated materials from the non-solvent medium and heating them at a temperature of at least 100° C. until the weight of the materials has increased by at least 5%.

10. Process for the treatment of yarns, cords, foils and other materials having a basis of regenerated cellulose which comprises impregnating the materials at about 40° C. in a solution consisting of about 10% of beeswax, 5% of acetic anhydride and 85% of benzene, the volume ratio of liquid to materials being about 100 to 1, removing the impregnated materials from the solution and reducing their content of the solution to an amount approximately equal to the weight of the materials and then heating the impregnated materials at a temperature of about 100–110° C. until their weight has increased by at least 5%.

ROBERT WIGHTON MONCRIEFF.
HAROLD BATES.